United States Patent
Drabant et al.

(10) Patent No.: US 9,760,734 B2
(45) Date of Patent: Sep. 12, 2017

(54) CATALOG-BASED USER AUTHORIZATION TO ACCESS TO MULTIPLE APPLICATIONS

(71) Applicant: SAP SE, Walldorf (DE)

(72) Inventors: Bernhard Drabant, Muehlhausen (DE); Bernhard Drittler, Walldorf (DE); Roland Lucius, Darmstadt (DE); Martin Schmid, Korntal-Muenchingen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/752,417

(22) Filed: Jun. 26, 2015

(65) Prior Publication Data
US 2016/0379002 A1    Dec. 29, 2016

(51) Int. Cl.
G06F 21/32    (2013.01)
G06F 21/62    (2013.01)

(52) U.S. Cl.
CPC .............................. *G06F 21/6236* (2013.01)

(58) Field of Classification Search
CPC ... G06F 21/6218; G06F 21/31; G06F 21/6236
See application file for complete search history.

(56) References Cited

U.S. PATENT DOCUMENTS

| | | | |
|---|---|---|---|
| 5,960,200 A * | 9/1999 | Eager ........................ | G06F 8/30 703/13 |
| 6,014,666 A * | 1/2000 | Helland .................. | G06F 9/468 |
| 6,041,325 A * | 3/2000 | Shah ................. | H04M 3/42136 |
| 6,161,139 A * | 12/2000 | Win ...................... | G06F 21/604 709/223 |
| 6,243,451 B1 * | 6/2001 | Shah ................. | H04M 3/42136 370/352 |
| 6,341,281 B1 * | 1/2002 | MacNicol ......... | G06F 17/30451 |

(Continued)

OTHER PUBLICATIONS

14752417 STIC Search Stragey Report (Requested May 22, 2017).*

(Continued)

*Primary Examiner* — Sharon Lynch
(74) *Attorney, Agent, or Firm* — Fountainhead Law Group P.C.

(57) ABSTRACT

Embodiments manage user authorization to access multiple grouped software applications, via a catalog mechanism. Functionality of related software is divided into semantically meaningful catalogs, representing tasks or sub-processes within a business scenario. These catalogs represent a unit of functionality utilized to structure work and authorization. Functionality and authorizations are associated to system entry points, and assigned to catalogs bundling applications and services. Responsibilities may be defined statically or dynamically in terms of rule-based access restrictions to data structure (e.g., business object) instances. Catalogs may be assigned to business roles, and business roles assigned to users. Based on such assignments, corresponding authorizations are generated and linked to users at compile or deployment time. At run time, access decision and enforcement is granted based on these authorizations and restrictions. Decision and enforcement points are associated with the system entry points within software applications belonging to catalog(s).

9 Claims, 6 Drawing Sheets

(56) References Cited

U.S. PATENT DOCUMENTS

| | | | | |
|---|---|---|---|---|
| 6,438,541 | B1* | 8/2002 | Witkowski | G06F 17/30451 707/714 |
| 6,523,027 | B1* | 2/2003 | Underwood | G06F 9/465 |
| 6,601,233 | B1* | 7/2003 | Underwood | G06F 8/24 717/100 |
| 7,100,195 | B1* | 8/2006 | Underwood | G06F 9/4443 707/999.009 |
| 7,979,463 | B2* | 7/2011 | Durbin | G06F 21/6227 707/781 |
| 8,489,677 | B2* | 7/2013 | Lategan | G06F 8/70 709/203 |
| 8,645,843 | B2* | 2/2014 | Chee | G06F 21/6218 709/206 |
| 2003/0152067 | A1* | 8/2003 | Richmond | H04L 63/0218 370/352 |
| 2004/0019799 | A1* | 1/2004 | Vering | G06F 21/6218 726/1 |
| 2004/0148409 | A1* | 7/2004 | Davis | H04L 63/105 709/229 |
| 2006/0259633 | A1* | 11/2006 | Spearman | H04L 63/105 709/229 |
| 2008/0071785 | A1* | 3/2008 | Kabra | G06F 17/30306 |
| 2008/0263060 | A1* | 10/2008 | Benantar | G06Q 10/06 |
| 2009/0171890 | A1* | 7/2009 | Johnson | G06F 17/30516 |
| 2010/0268722 | A1* | 10/2010 | Yalamanchi | G06F 17/30958 707/759 |
| 2013/0212703 | A1* | 8/2013 | Ramesh | G06F 21/6218 726/28 |
| 2014/0282261 | A1* | 9/2014 | Ranz | G06F 3/0482 715/838 |
| 2015/0058093 | A1* | 2/2015 | Jakobs | G06Q 10/06393 705/7.39 |
| 2015/0067828 | A1* | 3/2015 | Alvarez | H04L 63/062 726/19 |
| 2015/0074037 | A1* | 3/2015 | Sarferaz | G06F 17/30312 707/602 |
| 2015/0074038 | A1* | 3/2015 | Sarferaz | G06F 17/30563 707/602 |
| 2015/0074053 | A1* | 3/2015 | Sarferaz | G06F 17/30592 707/634 |
| 2015/0317486 | A1* | 11/2015 | Muller | G06F 17/30424 726/28 |
| 2016/0055222 | A1* | 2/2016 | Sarferaz | G06F 17/30587 707/603 |

OTHER PUBLICATIONS

Internet article entitled "Creating a Business Role," retrieved from: http://scn.sap.com/community/crm/webclient-ui-framework/blog/2012/11/25/creating-a-business-role posted on Nov. 25, 2012.

* cited by examiner

CATALOG-BASED USER AUTHORIZATION TO ACCESS TO MULTIPLE APPLICATIONS

BACKGROUND

Unless otherwise indicated herein, the approaches described in this section are not prior art to the claims in this application and are not admitted to be prior art by inclusion in this section.

Embodiments relate to software security, and in particular, to a catalog authorizing user access to multiple grouped software applications.

Enterprises increasingly rely upon software programs to perform a number of complex tasks. Example functions performed by various such software programs, can include but are not limited to Enterprise Resource Planning (ERP), Customer Relationship Management (CRM), and a host of others.

While different software applications may be utilized in these roles, they often share one or more functions and/or underlying data structures (e.g., business objects) stored in a database. And, separate security mechanisms are typically required to ensure secure user access to each such software application.

However, fine-grained checks and checks on business objects and functions called internally (secondary authorizations), can result in large and potentially confusing authorization profiles. Moreover, as such authorization profiles can be globally valid and compound cumulatively, it may become difficult to control exactly what a particular user actually can (or cannot) do within the system.

In particular, customer administrators may be forced to maintain a large number of different roles with static, manual definition of authorization values for each tuple of organizational and functional aspects. And, instance-based authority checks may be performed on the application server. This calls for a superset of available records to be loaded into the application server. Record-by-record processing is thus needed to determine if a record should be accessible to a user.

SUMMARY

Embodiments manage user authorization to access multiple grouped software applications, via a catalog mechanism. Functionality of related software is divided into semantically meaningful catalogs, representing tasks or sub-processes within a business scenario. These catalogs represent a unit of functionality utilized to structure work and authorization. Functionality and authorizations are associated to system entry points and assigned to catalogs, thereby bundling applications and services. Responsibilities may be defined statically or dynamically in terms of rule-based access restrictions to data structure (e.g., business object) instances. Catalogs may be assigned to business roles, and business roles assigned to users. Based on such assignments, corresponding authorizations are generated and linked to users at compile or deployment time. At run time, access decision and enforcement is granted based on these authorizations and restrictions. Decision and enforcement points are associated with the system entry points within software applications belonging to catalog(s).

An embodiment of a computer-implemented method comprises an engine receiving a role from a user. Based upon the role and a stored rule, the engine grants the user an authorization from a catalog to access a first system entry point of a first software application, and to access a second system entry point of a second software application.

A non-transitory computer readable storage medium embodies a computer program for performing a method comprising an engine receiving a role from a user, and based upon the role and a stored rule, the engine granting the user an authorization from a catalog to access a first system entry point of a first software application, and to access a second system entry point of a second software application. The first software application comprises a first functionality, the catalog further comprises a restriction, and the method further comprises the engine granting the user access to the first functionality according to the restriction.

An embodiment of a computer system comprises one or more processors and a software program, executable on said computer system. The software program is configured to cause an in-memory database engine to receive a role from a user, and based upon the role and a stored rule, grant the user an authorization from a catalog to access a first system entry point of a first software application, and to access a second system entry point of a second software application.

In certain embodiments the first software application comprises a first functionality, the catalog further comprises a restriction, and the method further comprises the engine granting the user access to the first functionality according to the restriction.

According to some embodiments a value of the restriction may be assigned at design time.

Various embodiments further comprise assigning a value of the restriction by evaluating the rule at runtime.

In particular embodiments the catalog is part of an in-memory database, and the engine comprises an engine of the in-memory database.

In certain embodiments the authorization is instance-based.

According to various embodiments the engine grants the authorization based upon a WHERE-clause.

In particular embodiments the first system entry point comprises an HTML graphic user interface.

According to some embodiments, the first system entry point is utilized in a key performance indicator.

The following detailed description and accompanying drawings provide a better understanding of the nature and advantages of embodiments.

DETAILED DESCRIPTION

Described herein are catalog-based systems and methods providing security authorization for user access to multiple software applications according to various embodiments. In the following description, for purposes of explanation, numerous examples and specific details are set forth in order to provide a thorough understanding of the present invention. It will be evident, however, to one skilled in the art that embodiments of the present invention as defined by the claims may include some or all of the features in these examples alone or in combination with other features described below, and may further include modifications and equivalents of the features and concepts described herein.

Particular embodiments manage user authorization to access multiple grouped software applications, via a catalog mechanism. Functionality of related software is divided into semantically meaningful catalogs, representing tasks or sub-processes within a business scenario. These catalogs represent a unit of functionality utilized to structure work and authorization. Functionality and authorizations are associated to system entry points and assigned to catalogs, thereby bundling applications and services. Responsibilities may be defined statically or dynamically in terms of rule-based access restrictions to data structure (e.g., business object) instances. Catalogs may be assigned to business roles, and business roles assigned to users. Based on such assignments, corresponding authorizations are generated and linked to users at compile or deployment time. At run time, access decision and enforcement is granted based on these authorizations and restrictions. Decision and enforcement points are associated with the system entry points within software applications belonging to catalog(s).

Figure 1:
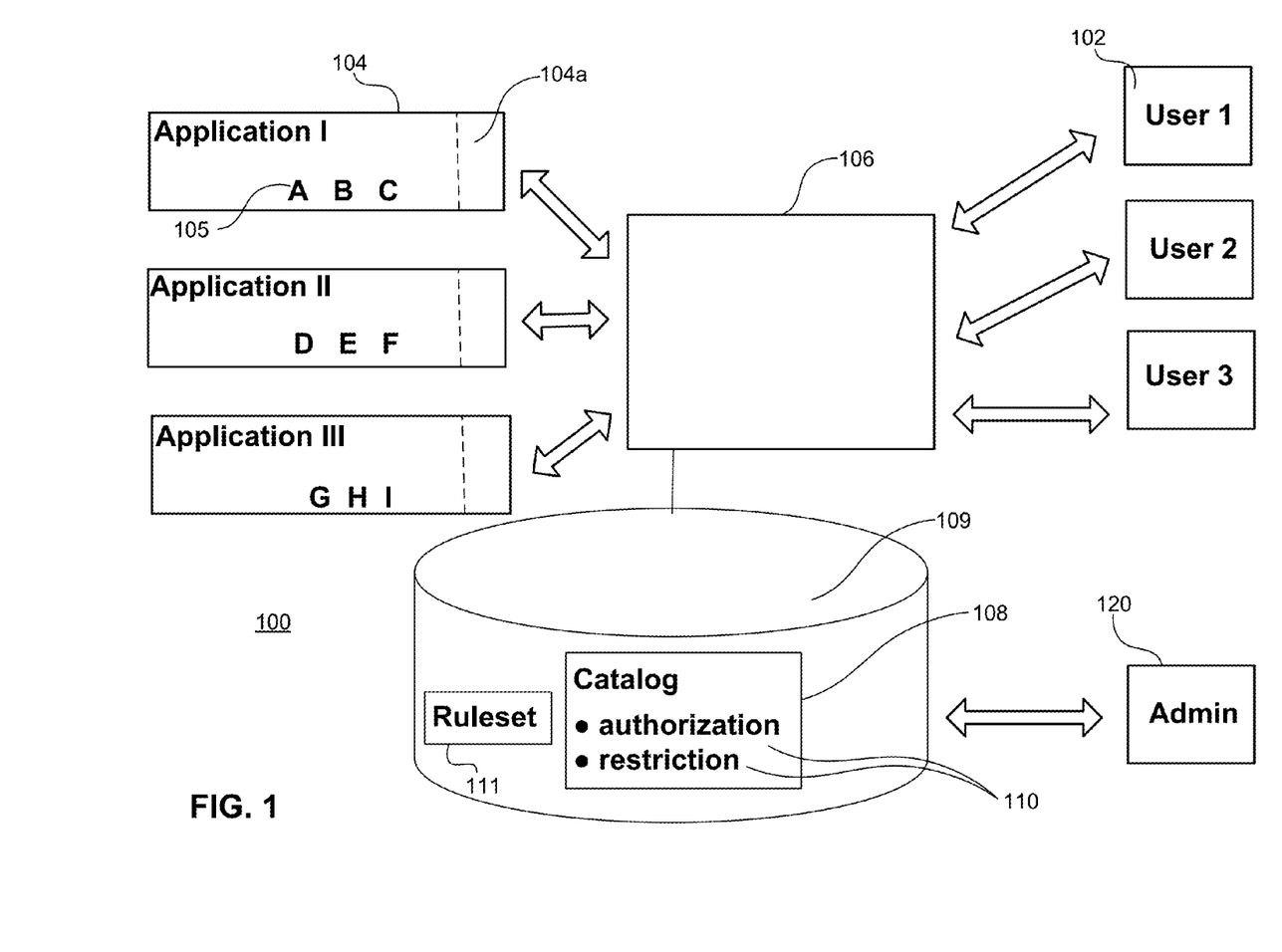
FIG. 1 shows a simplified view of a system according to an embodiment.

FIG. 1 presents a simplified view of a system 100 according to an embodiment. In particular, a plurality of users 102 seek to access multiple software applications 104, each including one or more functions/services 105.

Accordingly, the users are in communication with an engine 106 that is configured to access a catalog 108. The catalog has stored therein in a non-transitory computer readable storage medium 109, a plurality of data structures 110 that include data components such as, authorization, and restriction.

The non-transitory computer readable storage medium also has stored thereon, a plurality of rules. The engine is configured to reference the rules and the catalog to control access by users to one or more of the software applications.

In particular, the engine is in communication with the entry point(s) 104*a* of the respective applications, to govern access thereto. Accordingly, the engine may grant a user access to some or all functionality/services available to a particular application, by using the catalog to identify relevant access data corresponding to that particular user.

In this manner, the engine and the catalog offer a convenient, centralized location to regulate access by a plurality of users to a plurality of different software applications/systems. As shown in FIG. 1, an administrator 120 may easily and unequivocally use this catalog as a centralized location to change, update, or inspect global user access to the multiple software systems in a simple and transparent manner. As further described below in connection with the example, this access modification can be implemented via the use of restrictions.

As mentioned above, embodiments implement an authorization concept in which functionality and authorizations are associated to system entry points and assigned to catalogs that bundle applications and services.

For catalog(s), responsibilities may optionally be defined in terms of access restrictions on business object instances. Such restrictions may be rule-based.

In some embodiments catalogs will be assigned to business roles. In certain embodiments business roles will be assigned to users. Based upon these assignments, the corresponding authorizations will be generated in the systems and linked to the users at compile or deployment time.

At run time, access decision and enforcement may be granted based on these authorizations and restrictions. The decision and enforcement points are associated with the system entry points of the applications within a catalog.

Figure 2:
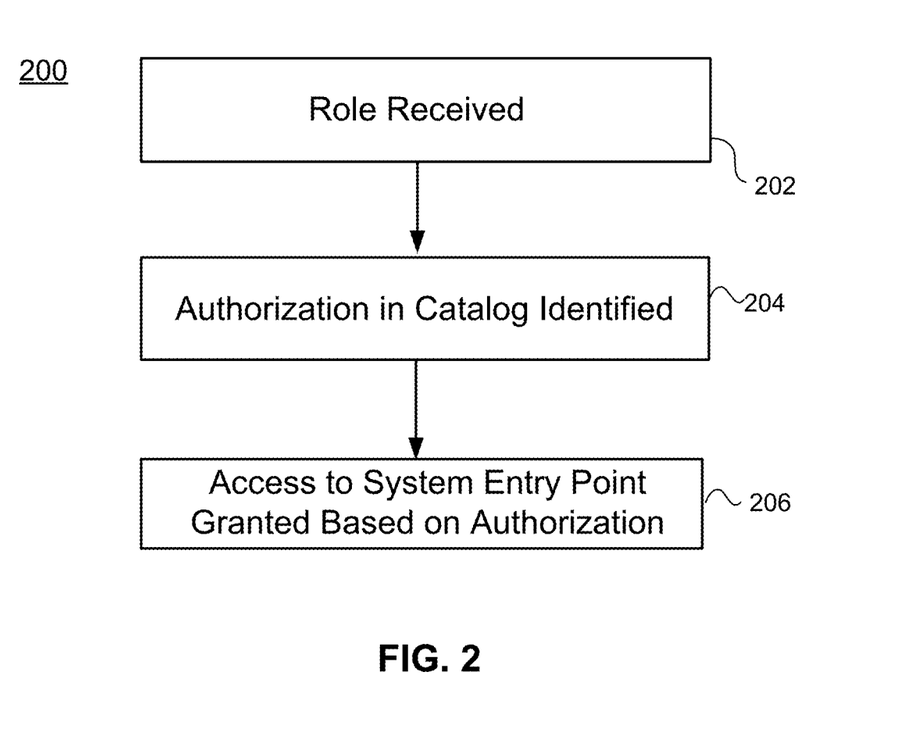
FIG. 2 is a simplified process flow according to an embodiment.

FIG. 2 is a simplified flow diagram showing a method 200 according to an embodiment. In a first step 202, an engine receives an input in the form of a role of a user. Such a role can be assigned based upon the responsibilities and activities expected to be performed by the user. Further details regarding roles are provided in connection with the example below.

In a second step 204, based upon the user's role, the engine identifies within a catalog, a data object including an authorization. In a third step 206, the engine grants the user access to an entry point of software application(s) based upon the authorization.

Further details regarding catalog-based user access to software, are now provided in connection with the following example.

EXAMPLE

An example of catalog-based software user access according to one embodiment, is now described in connection with various software programs available from SAP SE of Walldorf, Germany. In particular, this example offers catalog-based access to a suite of business applications that are available from SAP.

This example describes a user accessing business functionality applications, reports, and Key Performance Indicators (KPIs) based on Core Data Services (CDS) views, Web Dynpro applications, and in certain cases HTML GUI applications, in a secure manner via a catalog. This example implements authorization by leveraging i) a catalog feature of a business platform, together with ii) the role definition capability that may be available.

For example, one kind of role is a business role. A business role can serve to define a user in the software application during runtime.

Thus within the context of CRM software, users may be assigned business roles depending upon responsibilities and activities expected to be undertaken as part of their job duties within the organization. For example, sales personnel will be assigned with sales professional business role, which includes activities ordinarily encountered during the sales process. Marketing personnel will be assigned with marketing professional business role consistent with activities in the marketing process. The business role can control aspects of the user interface and provided links.

The simplified modelled approach to system access afforded by embodiments, reduces much of the complexity at design time. To reduce the complexity of authority checks throughout the coding, the system entry points (e.g. OData services) and the data access of the applications are protected.

Authority checks for mass data read access may be pushed down to the database through corresponding WHERE-clauses expressed via Data Control Languages (DCLs). In this manner, permitted values are calculated in the database, for example by the powerful engine available to an in-memory database (e.g., the SAP HANA database).

The use of relevant artifacts and their relation is now discussed for this example. From a high-level perspective, the authorization process according to this example considers the following issues.

First, users want to utilize business and system functionality. Second, users may be granted access to (subsets of) this functionality through assignment of authorizations in terms of business roles.

Further limitations of the permissions, for example on an instance level, may be implemented by restrictions. Such restrictions provide a convenient way for customers' administrators to define a more fine granular access to the according resources.

Figure 3:
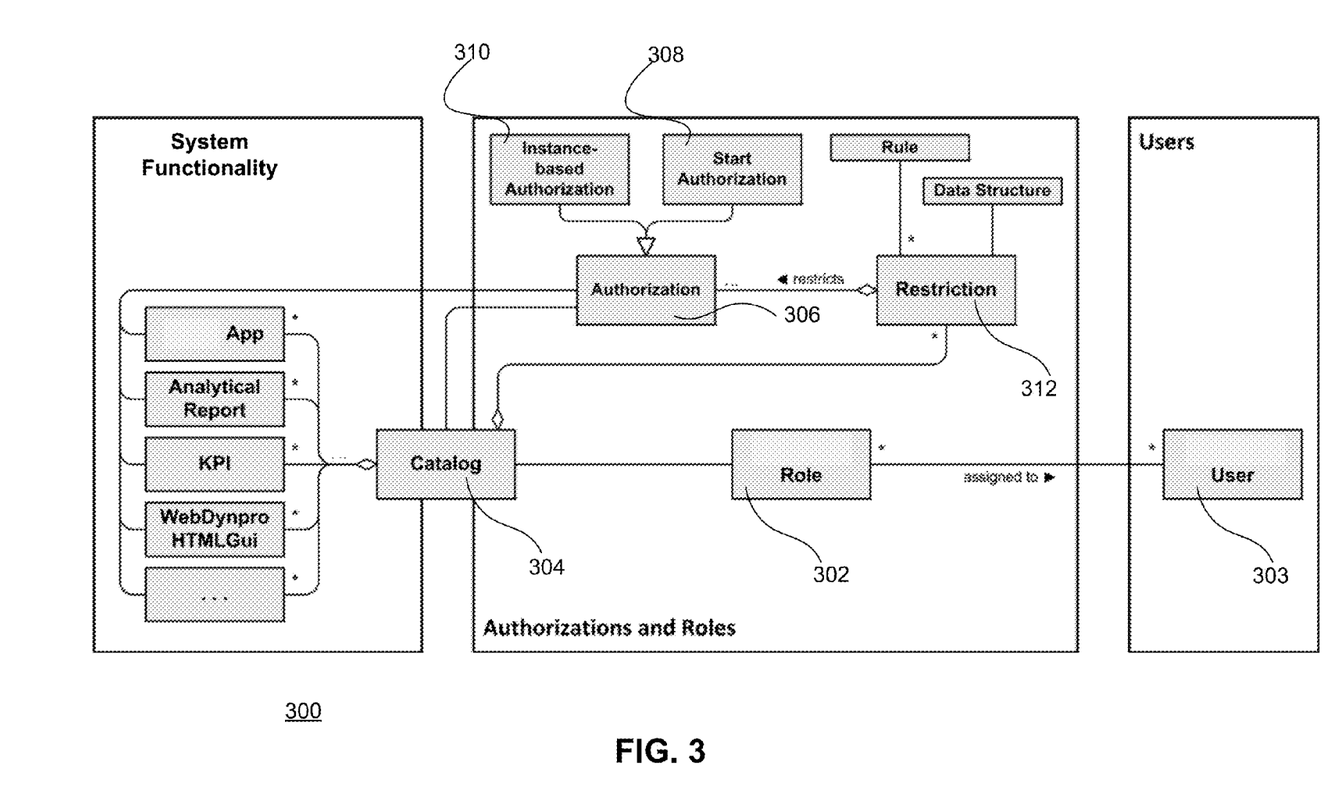
FIG. 3 provides an architecture of an embodiment of a system to provide user access according to an example.

FIG. 3 is a simplified block diagram depicting the meta-model of the relevant entities and their relations in this example. The meta-model 300 provides the overall framework for modelling authorizations and is the basis of the authorization models.

The semantics of the main entities and relations are now described as follows. The central entity for user authorization is the business role 302.

Business roles are assigned to business users 303. Business roles comprise several catalogs.

A catalog 304 comprises a self-contained unit from an application domain perspective.

A catalog may be considered as bundling together a number of different entities. For example, a catalog may bundle a set of functionality in terms of business applications, reports, KPIs, etc.

Such reports can be of analytical nature, like a Design Studio report or some other analytical report variant. A KPI provides a measured entity and is associated with a threshold for that entity. Business applications, reports, or KPIs each have a set of system entry points. Others include certain legacy applications like WebDynpros/HTML GUIs.

In certain embodiments a set of authorizations 306 may be associated to each application, report, KPI, etc.

Some embodiments may feature a set of restrictions which further adjust and confine the authorizations. The restrictions may be defined as restriction fields of a certain restriction type. One restriction type may be associated to a catalog, and several catalogs may be associated to a restriction type.

Authorizations describe that particular functionality and data which can be accessed by the business user. In this example there are two types of authorizations.

Start authorizations 308 are used to launch functionality. Instance based authorizations 310 limit access on a data object on an instance level. Instance-based authorizations may be role-specific and/or user-specific.

Authorizations may be further adjusted and confined through restrictions 312 defined at the catalog level.

Examples of authorizations may include but are not limited to the following. In the authorization concept of the SAP ABAP language, the authorizations are realized by the PFCG authorization objects of a business role or user. In the SAP ByDesign environment, the authorizations are provided on the level of business objects and on instance level through Access Control Lists (ACLs).

Embodiments may offer a number of restriction types. A restriction type is a map to authorizations. In such embodiments the mapping may be determined by restriction type.

A restriction type is a data structure determined by the restriction fields. In such embodiments the fields can be part of a global field catalog.

Some restriction types may be reused in different catalogs.

Restriction types may be instantiated by assigning values to the fields. The values can be assigned explicitly at design time.

Alternatively, the values can be assigned by evaluating dedicated rules at runtime. The rules are associated to the restriction type on the model level.

Restrictions modify the access permissions supplied by the corresponding authorizations. Several restriction instances of the same type can be created per catalog in a business role.

This leads to extended access behavior. For example, the access permission expressed in terms of PFCG authorizations may be computed by logical or-combination of the authorizations related to system entry points and defined by restriction instances.

An entitled key user generates a business role from catalogs and restrictions by configuring catalogs and defining according restriction instances. More details can be found in details on the creation of business role.

On a more technical level, authorizations will be enforced at services, WebDynpros, data containers, etc. These are the entry points to the underlying systems.

Figure 4:
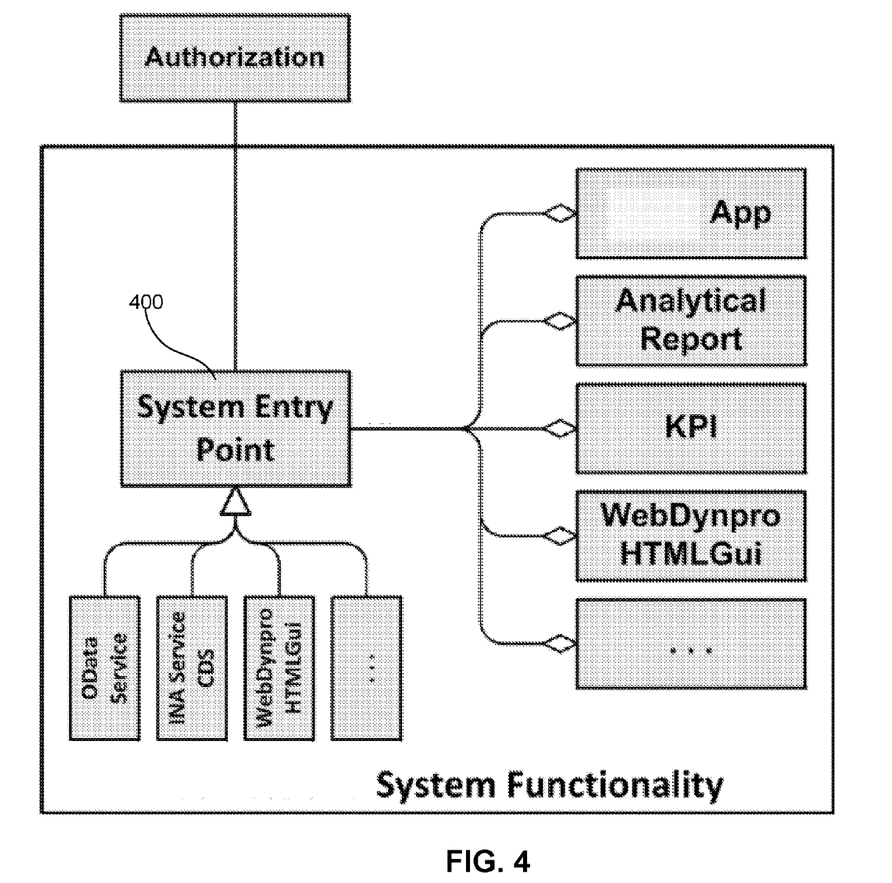
FIG. 4 provides an enlarged view of access control according to the example of FIG. 3.

The system entry points in turn are bundled and utilized in apps, reports, KPIs. FIG. 4 shows assignment in FIG. 3 of authorizations to apps, reports, KPIs further resolved to the level of system entry points 400.

Meanings of the relevant entities and relations in FIG. 4 are given as follows. To each business application, report, analytical report, KPI, etc., a set of system entry points are associated.

A system entry point is the component providing access to the underlying system. Here, system entry points may be OData services for transactional applications, INA services for analytical queries, Web Dynpro apps etc.

Authorizations are associated to system entry points. A system entry point enforces access to the system's functionality and data. System access is granted if the authorizations of the requestor's business role match the required authorizations associated to the system entry point.

Further confinement of access (for example on the data instance level), may be achieved through restrictions associated to the business role's catalogs.

In this example, for each catalog SAP prepares and prefills authorizations required for the applications in the catalog. The link from catalog to authorizations may be established via an integration with a tool used to define business roles, and in this particular example also used to further define authorization based upon those business roles.

For each catalog, SAP development defines the restriction type, which is a set of fields for authorization restrictions exposed to the customer admin. These restriction fields map to authorization fields which may not be pre-populated by SAP.

The customer administrator defines business roles via a Web UI, by combining catalogs and values for the restriction definition. Such business roles represent a kind of "work center" covering a certain business process and responsibility area.

In the case of ABAP backend systems, PFCG roles are generated based on the predefined authorization data and the definitions by the customer key user.

Utilizing catalog-based access according to embodiments, authorization runtime and tools can be enhanced. A privileged mode may address the issue of large and confusing authorization profiles due to secondary authorizations. Static definitions of restriction values can be enriched with rule-based definitions for dynamic data retrieval, especially for frequently-changing structures such as organizations, cost center hierarchies, etc. Such an approach reduces both the number of roles and the maintenance effort caused by the changes.

In summary, the simplified modelled approach offered by this example reduces much of the complexity at design time. To reduce the complexity of authority checks throughout the coding, only the system entry points (e.g. OData services) and the data access of the applications will be protected.

Authority checks for mass data read access will be pushed down to the database through corresponding WHERE-clauses expressed via DCLs. Thereby, permitted values are calculated in the database, and data is filtered there based on the pre-defined restrictions. Leveraging the processing power available to an in-memory database engine, may also serve to yield better performance.

Figure 5:
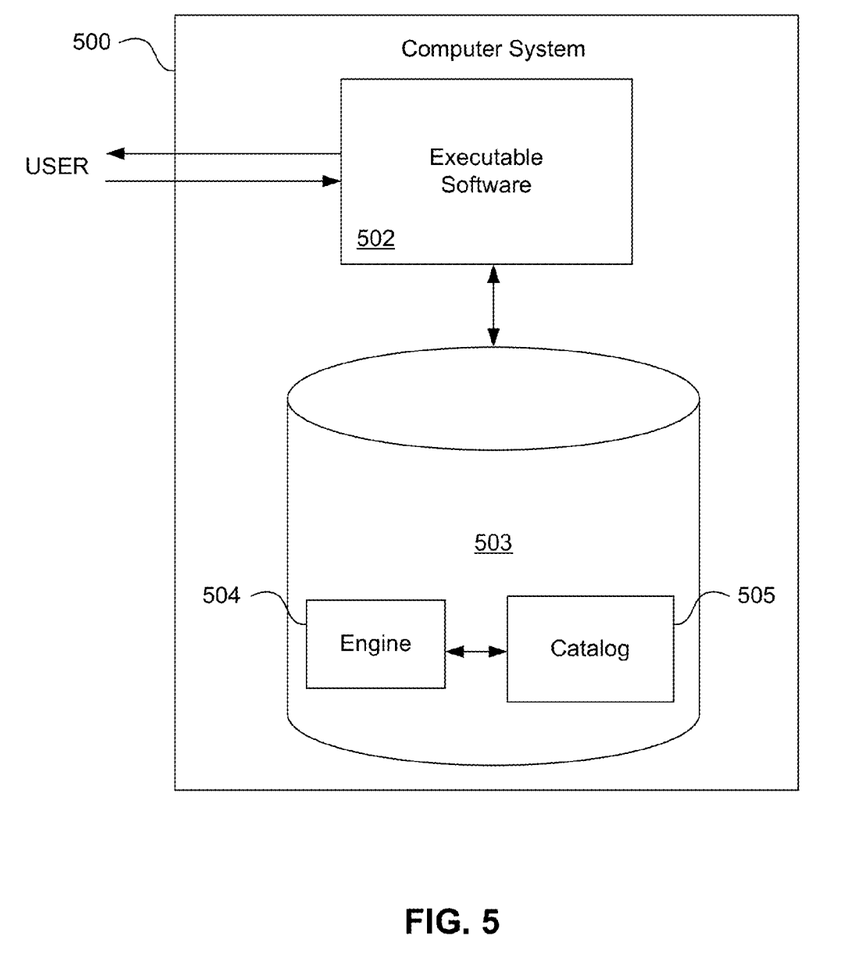
FIG. 5 illustrates hardware of a special purpose computing machine configured to authorize user access to software according to an embodiment.

FIG. 5 illustrates hardware of a special purpose computing machine configured to authorize user access to software according to an embodiment. In particular, computer system 500 comprises a processor 502 that is in electronic communication with a non-transitory computer-readable storage medium 503. This computer-readable storage medium has stored thereon code 505 corresponding to a catalog. Code 504 corresponds to an engine. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

It is noted that in the specific embodiment of FIG. 5, the engine is shown as being part of the database. Such an embodiment can correspond to applications performing processing by a powerful engine available as part of an in-memory database (e.g., the HANA in-memory database available from SAP SE of Walldorf, Germany). However this is not required and in certain embodiments the engine may be implemented in other ways, for example as part of an overlying application layer.

Figure 6:
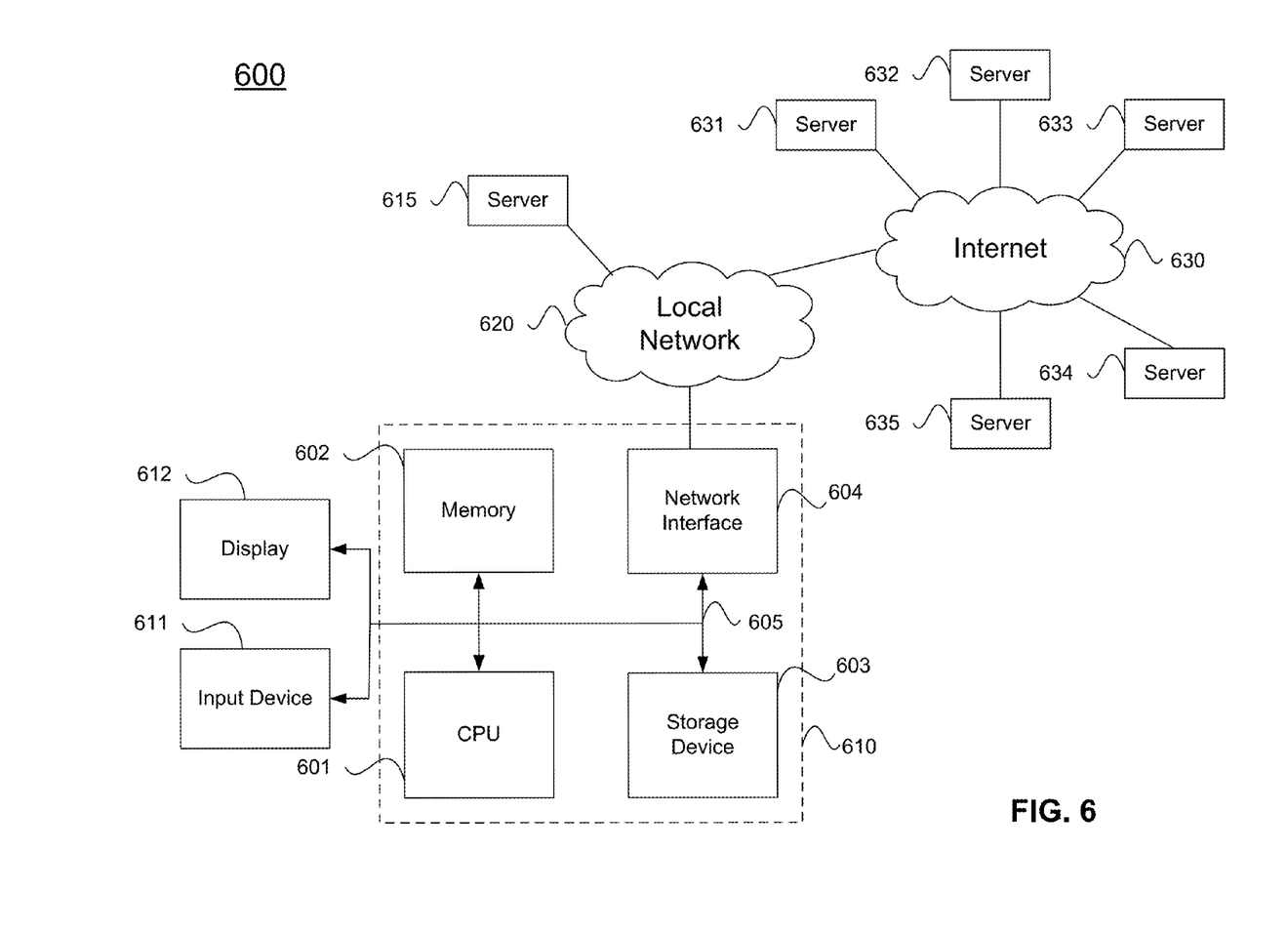
FIG. 6 illustrates an example computer system.

An example computer system 600 is illustrated in FIG. 6. Computer system 610 includes a bus 605 or other communication mechanism for communicating information, and a processor 601 coupled with bus 605 for processing information. Computer system 610 also includes a memory 602 coupled to bus 605 for storing information and instructions to be executed by processor 601, including information and instructions for performing the techniques described above, for example. This memory may also be used for storing variables or other intermediate information during execution of instructions to be executed by processor 601. Possible implementations of this memory may be, but are not limited to, random access memory (RAM), read only memory (ROM), or both. A storage device 603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 603 may include source code, binary code, or software files for performing the techniques above, for example. Storage device and memory are both examples of computer readable mediums.

Computer system 610 may be coupled via bus 605 to a display 612, such as a cathode ray tube (CRT) or liquid crystal display (LCD), for displaying information to a computer user. An input device 611 such as a keyboard and/or mouse is coupled to bus 605 for communicating information and command selections from the user to processor 601. The combination of these components allows the user to communicate with the system. In some systems, bus 605 may be divided into multiple specialized buses.

Computer system 610 also includes a network interface 604 coupled with bus 605. Network interface 604 may provide two-way data communication between computer system 610 and the local network 620. The network interface 604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 610 can send and receive information, including messages or other interface actions, through the network interface 604 across a local network 620, an Intranet, or the Internet 630. For a local network, computer system 610 may communicate with a plurality of other computer machines, such as server 615. Accordingly, computer system 610 and server computer systems represented by server 615 may form a cloud computing network, which may be programmed with processes described herein. In the Internet example, software components or services may reside on multiple different computer systems 610 or servers 631-635 across the network. The processes described above may be implemented on one or more servers, for example. A server 631 may transmit actions or messages from one component, through Internet 630, local network 620, and network interface 604 to a component on computer system 610. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method of providing entry point security, the method comprising:
   an in-memory database engine of an in-memory database receiving a role from a user, wherein the role is defined by a first transactional software application according to an Open Data (OData) protocol utilizing an OData service;
   based upon the role and a first stored rule, the in-memory database engine granting the user a first start authorization from a catalog that is part of the in-memory database to access a first system entry point and launch a key performance indicator functionality;
   based upon a second stored rule, the in-memory database granting the user a second read authorization from the catalog to access a second system entry point of a second software application;
   wherein the in-memory database engine grants the first start authorization and the second read authorization based upon a WHERE-clause expressed via a data control language and pushed down to the in-memory database, and wherein the first system entry point and the second system entry point are utilized in the key performance indicator functionality wherein the catalog further comprises a restriction; and the method further comprises the engine granting the user access to the key performance indicator functionality according to the restriction.

2. A computer-implemented method of providing entry point security as in claim 1 further comprising assigning a value of the restriction at design time.

3. A computer-implemented method of providing entry point security as in claim 1 further comprising assigning a value of the restriction by evaluating the second stored rule at runtime.

4. A computer-implemented method of providing entry point security as in claim 1 wherein the second read authorization is instance-based.

5. A computer-implemented method of providing entry point security as in claim 1 wherein the second system entry point comprises an HTML graphic user interface.

6. A non-transitory computer readable storage medium embodying a computer program for performing a method of providing entry point security, said method comprising:

an in-memory database engine of an in-memory database receiving a role from a user, wherein in the role is defined by a first transactional software application according to an Open Data (OData) protocol utilizing an OData service;

based upon the role and a first stored rule, the in-memory database engine granting the user a first start authorization from a catalog that is part of the in-memory database to access a first system entry point and launch a key performance indicator functionality;

based upon a second stored rule, the in-memory database granting the user a second read authorization from the catalog to access a second system entry point of a second software application;

wherein the in-memory database grants the first start authorization and the second read authorization based upon a WHERE-clause expressed via a data control language and pushed down to the in-memory database, wherein the first system entry point and the second system entry point are utilized in a key performance indicator;

wherein, the catalog further comprises a restriction; and the method further comprises the in-memory database engine granting the user access to the key performance indicator functionality according to the restriction.

7. A non-transitory computer readable storage medium as in claim 6 wherein the method of providing entry point security further comprising assigning a value of the restriction at design time.

8. A non-transitory computer readable storage medium as in claim 6 wherein the method of providing entry point security further comprises assigning a value of the restriction by evaluating the second stored rule at runtime.

9. A non-transitory computer readable storage medium as in claim 6 wherein the second read authorization is instance-based.

* * * * *